(12) United States Patent
Zegelin

(10) Patent No.: US 6,484,216 B1
(45) Date of Patent: Nov. 19, 2002

(54) ADAPTIVE COMPUTER PERIPHERAL WITH PERMANENTLY DISABLED DEFAULT PROTOCOL

(75) Inventor: Christopher Zegelin, San Jose, CA (US)

(73) Assignee: Symbol Technologies, INC, Holtsville, NY (US)

( * ) Notice: Subject to any disclaimer, the term of this patent is extended or adjusted under 35 U.S.C. 154(b) by 21 days.

(21) Appl. No.: 09/611,721

(22) Filed: Jul. 5, 2000

Related U.S. Application Data

(63) Continuation of application No. 08/928,318, filed on Sep. 12, 1997, now Pat. No. 6,138,180.

(51) Int. Cl.[7] ............................................. G06F 13/10
(52) U.S. Cl. ............................ 710/11; 710/2; 710/8; 710/62; 710/72
(58) Field of Search .......................... 710/2, 8, 3, 4, 710/5, 6, 7, 11, 14, 72, 126, 129, 62

(56) References Cited

U.S. PATENT DOCUMENTS

| | | | |
|---|---|---|---|
| 5,551,068 A | * | 8/1996 | Goldsmith et al. ............ 455/89 |
| 5,655,092 A | * | 8/1997 | Ojala ......................... 395/309 |
| 5,842,039 A | * | 11/1998 | Nanaway et al. ............ 395/831 |
| 5,920,731 A | * | 7/1999 | Pletl et al. .................. 395/834 |

* cited by examiner

Primary Examiner—Jeffrey Gaffin
Assistant Examiner—Harold Kim
(74) Attorney, Agent, or Firm—Kirschstein, et al

(57) ABSTRACT

A computer peripheral connected via an electrical interface connector to a computer includes a functional module comprising circuitry for performing functions of the computer peripheral. The electrical interface connector is configured to convey a first interface set of signals, and includes a plurality of conductors for conveying a plurality of signals. An interface adapter is coupled to the electrical interface connector, the interface adapter being configured to process signals passing between the electrical interface connector and the functional module to permit a second interface set of signals to be conveyed via the electrical interface connector.

10 Claims, 6 Drawing Sheets

| | PCMCIA ASSIGNMENTS | | | ALTERNATIVE INTERFACE ASSIGNMENTS | | |
|---|---|---|---|---|---|---|
| PIN | SIGNAL | I/O | FUNCTION | SIGNAL | I/O | FUNCTION |
| 58 | RESET | I | CARD RESET: WHEN HIGH, RETURNS PC CARD TO MINIMUM POWER CONSUMPTION. INTERNAL LOGIC RESET, AND I/O MODE DISABLED. | RESET | I | CARD RESET: SAME FUNCTION |
| 7 | CE1# | I | CARD ENABLE: LOW FOR ACCESSING PC CARD INTERFACE | CE1# | I | CARD ENABLE: MUST BE LOW TO ACCESS NEW INTERFACE |
| 8, 10-14, 21-29 | HA 14:0 | I | ADDRESS BUS: ADDRESS SPACE FOR MEMORY ACCESSES IS 32 KBYTES. | HA 5:0 | I | ONLY HA 5:0 USED FOR I/O ACCESSES; ADDRESS SPACE IS 64 BYTES |
| 9 | OE# | I | OUTPUT ENABLE | OE# | I | BROUGHT LOW TO CONVERT TO NEW INTERFACE |
| 15 | WE# | I | WRITE ENABLE | WE# | I | BROUGHT LOW TO CONVERT TO NEW INTERFACE |
| 61 | REG# | I | ATTRIBUTE MEMORY SELECT | PDNOW# | I | POWER DOWN NOW: |
| 59 | WAIT# | O | EXTEND BUS CYCLE | WAIT# | | |
| 30-32, 2-6 | HD 7:0 | I/O | DATA BUS | HD 7:0 | I/O | DATA BUS |
| 44 | IORD# | I | I/O READ | IORD# | I | I/O READ: TRUE LOW READ SIGNAL. IF EITHER PDREQ# OR PDNOW# IS ACTIVE, LOW, THEN THIS READ SIGNAL IS DISABLED AND CAN BE TAKEN LOW WITHOUT CAUSING A READ CYCLE. |

| | PCMCIA ASSIGNMENTS | | | ALTERNATIVE INTERFACE ASSIGNMENTS | | |
|---|---|---|---|---|---|---|
| PIN | SIGNAL | I/O | FUNCTION | SIGNAL | I/O | FUNCTION |
| 45 | IORW# | I | I/O WRITE | IORW# | I | I/O WRITE: TRUE LOW WRITE SIGNAL. IF EITHER PDREQ# OR PDNOW# IS ACTIVE, LOW, THEN THIS WRITE SIGNAL IS DISABLED AND CAN BE TAKEN LOW WITHOUT CAUSING A WRITE CYCLE. |
| 60 | INPACK# | O | INPUT ACKNOWLEDGE | | | |
| 16 | BUSY/ IREQ# | O | BUSY AND INTERRUPT REQUEST: DURING AND IMMEDIATELY AFTER RESET, INDICATES MODULE IS BUSY INITIALIZING ITSELF. OPTIONAL I/O MODE FOR PC CARD REDEFINES PIN AS INTERRUPT REQUEST PIN. | | | |
| 63 | STSCHG | O | STATUS CHANGE: SIGNAL IS USED BY THE INTERFACE CONTROLLER TO INDICATE IT REQUIRES SERVICE FROM THE HOST. | PUIND | | POWER UP INDICATE |
| 59 | WAIT# | O | EXTEND BUS CYCLE | WAIT# | O | EXTEND BUS CYCLE |
| 22 | HA 7 | I | THE FOLLOWING ADDRESS PINS ARE DISCUSSED ABOVE: REASSIGNED IN NEW INTERFACE | SEN | I | SERIAL PORT ENABLE: IF HIGH, THE SERIAL PORT IS ENABLED. IF LOW, THE CLOCK TO THE SERIAL PORT LOGIC IS DISABLED TO MINIMIZE POWER CONSUMPTION |
| 12 | HA 8 | I | | ECLKEN | I | EXTERNAL CLOCK ENABLE: IF HIGH, ENABLES ECLK INPUT TO PROVIDE SERIAL CLOCK |

FIG. 4C

| PIN | PCMCIA ASSIGNMENTS | | | ALTERNATIVE INTERFACE ASSIGNMENTS | | |
|---|---|---|---|---|---|---|
| | SIGNAL | I/O | FUNCTION | SIGNAL | I/O | FUNCTION |
| 11 | HA 9 | I | | ECLK | I | EXTERNAL CLOCK: OPTIONAL EXTERNAL CLOCK INPUT FOR THE SERIAL PORT. THE CLOCK SHOULD BE 16 TIMES THE REQUIRED BAUD RATE. THE CLOCK IS NOT GATED BY POWER DOWN MODES, SO MUST BE TURNED OFF BY THE HOST TO MINIMIZE POWER CONSUMPTION |
| 14 | HA 14 | I | | SI | I | SERIAL INPUT: CONNECTS DIRECTLY TO A LINE DRIVER DEVICES SUCH AS AN RS232 INTERFACE. |
| 21 | HA 12 | I | | SIFC | O | SERIAL INPUT FLOW CONTROL: THIS SIGNAL GOES ACTIVE (HIGH/LOW) WHEN THE INTERNAL RECEIVE FIFO BUFFER IS NEARLY FULL. SIGNAL GOES TRI-STATE DURING POWER DOWN OR IF SEN IS LOW |
| 13 | HA 13 | I | | SO | O | SERIAL OUTPUT: CONNECTS DIRECTLY TO A LINE DRIVER DEVICES SUCH AS AN RS232 INTERFACE. SIGNAL GOES TRI-STATE DURING POWER DOWN OR IF SEN IS LOW |
| 10 | HA 11 | I | | SOFC | I | SERIAL OUTPUT FLOW CONTROL: THIS SIGNAL CAN BE TAKEN ACTIVE TO STOP ADDITIONAL CHARACTERS FROM BEING SENT. IF NOT USED, THE SIGNAL SHOULD BE TIED (HIGH OR LOW) |
| 8 | HA 10 | I | | PDREQ# | I | POWER DOWN REQUEST |

ADAPTIVE COMPUTER PERIPHERAL WITH PERMANENTLY DISABLED DEFAULT PROTOCOL

This is a continuation of application Ser. No. 08/928,318, filed Sep. 12, 1997 now U.S. Pat. No. 6,138,180.

BACKGROUND OF THE INVENTION

The present invention relates to adaptive computer peripherals.

Manufacturers of computer peripherals generally produce the same type of peripheral with several different interfaces, so that end users having a computer with only one type of interface may use the peripheral. For example, an external modem may be supplied in two varieties, one having a serial interface, and another a PCMCIA interface. Likewise, a computer mouse might be supplied in two varieties, a parallel mouse and a serial mouse.

Such duplication of products means that manufacturers must often design, manufacture and test a multiplicity of different products. Retailers have a similar problem in that they must supply and stock a large variety of different products. Difficulties arise when a purchaser requests a particular peripheral without specifying the interface with which it is to be used, or alternatively specifies the interface wrongly. In either event, the purchaser receives a product that is incompatible with his own computer system.

The problem of incompatible interfaces on a computer and on a peripheral is of course well known. One approach is to provide additional hardware, either on the computer, on the peripheral, or by way of interchangeable hardware interfaces which sit between the computer and the peripheral. Such approaches are illustrated in U.S. Pat. Nos. 5,280,621, 5,347,113, and 5,258,604. An appropriate interface could be incorporated either within the computer, or within the peripheral, the latter being the approach illustrated in U.S. Pat. No. 5,179,270. An alternative approach is to force both the computer and the peripheral to communicate by means of a common format or protocol. This requires a mechanism for translating the native protocols of both the computer and the peripheral to the common protocol, and vice-versa. Such an approach is used in U.S. Pat. Nos. 4,458,439 and 4,897,799. It is also known to provide hardware or software in the peripheral which allows the peripheral to emulate the communications protocol required by the main computer, as shown in U.S. Pat. No. 5,567,925. Finally, for the sake of completeness, U.S. Pat. No. 4,866,257 may be referred to illustrate the general teaching of a host computer controlling a computer peripheral via an interface within the peripheral.

OBJECTS OF THE INVENTION

It is an object of the present invention to enhance the flexibility of computer peripherals by providing a peripheral which is capable of communicating via a number of different protocols, according to instructions received from the computer via a conventional interface.

It is a further object, in at least some embodiments, to provide that flexibility without the need for the computer to include any additional hardware.

SUMMARY OF THE INVENTION

According to a first aspect of the present invention there is provided a computer peripheral comprising:

(a) an electrical interface connector for connecting the peripheral for external communication;

(b) a functional module for performing functions of the peripheral; and (c) an interface adapter, coupled to the electrical interface connector and to the functional module, the interface adapter being configured to select one of a first communications protocol and a second communications protocol, by which selected protocol the peripheral communicates externally via the electrical interface connector, according to one or more external control signals received at the electrical interface connector.

According to a second aspect of the invention there is provided a computer system comprising a computer peripheral as previously defined, in combination with a computer, the electrical interface connector of the peripheral being coupled with a peripheral connector of the computer for communication between the peripheral and the computer.

According to a further aspect of the invention there is provided a method of controlling a computer peripheral having an electrical interface, a functional module for performing functions of the peripheral, and an interface adapter coupled to the electrical interface and to the functional module, the method comprising the steps of:

(a) supplying an external control signal at the electrical interface;

(b) on receipt of the control signal by the interface adapter, selecting a communications protocol by which the peripheral will communicate externally; and (c) effecting external communications, via the electrical interface, according to the selected protocol.

According to yet a further aspect of the invention there is provided a method of controlling communications within a computer system comprising a coupled computer and computer peripheral, the method comprising the steps of:

(a) causing the computer to send a control signal to the peripheral;

(b) selecting a communications protocol in dependence upon the control signal; and (c) effecting communication between the computer and the peripheral according to the selected protocol.

In brief, the invention features a computer peripheral that includes a functional module, an electrical interface connector configured to convey one interface set of signals, and an interface adapter that processes signals passing between the electrical interface connector and the functional module and that permits a second interface set of signals to be conveyed via the electrical interface connector.

Embodiments of the invention may include one or more of the following features. The first interface set of signals can be that of a PCMCIA-type set of signals, or a parallel interface-type set of signals. As is known to those skilled in the art, PCMCIA is a standard for connecting peripherals to computers which has been set by the Personal Computer Memory Card International Association.

The standard interface set of signals can be that of a personal computer serial interface, parallel interface, or both. The interface adapter can permit the second interface set of signals to be conveyed via the electrical interface connector upon receipt of an interface change signal conveyed by the electrical interface connector. The interface change signal can include a non-standard signal within the first interface set of signals. Where the first interface protocol is that of a PCMCIA-type set of signals, the interface change signal can include having both output enable (OE) and write enable (WE) low. The electrical interface connector can be a PCMCIA-type connector. An adapter cable having two ends can couple one end to the electrical interface connector associated with the first interface set of signals, and the second end to a second electrical interface connector associated with the second interface set of signals.

The advantages of the invention may include one or more of the following. A single computer peripheral can provide several standard interfaces, including a PCMCIA-compliant interface, a serial port and an microprocessor compatible I/O parallel port. A simple set of signals (Output Enable and Write Enable) tied low can convert the interface module to provide the parallel and serial port options. Only one computer peripheral need be designed, manufactured, maintained, stocked, qualified and sold to provide a variety of standard interfaces to end users. A simple adapter cable can couple the computer peripheral to another type of electrical interface connector, e.g. a peripheral with a PCMCIA-type electrical interface connector can be coupled to a computer with a serial-type electrical interface connector.

Other features and advantages of the invention will become apparent from the following description and from the claims.

The invention may be carried into practice in a number of ways, and a number of specific embodiments will now be described, by way of example, with reference to the accompanying drawings.

BRIEF DESCRIPTION OF THE DRAWINGS

FIGS. 4A, 4B and 4C are portions of an exemplary table of pin assignments, suitable for use with an adaptive computer peripheral according to the present invention.

DESCRIPTION OF THE PREFERRED EMBODIMENT

Figure 1:
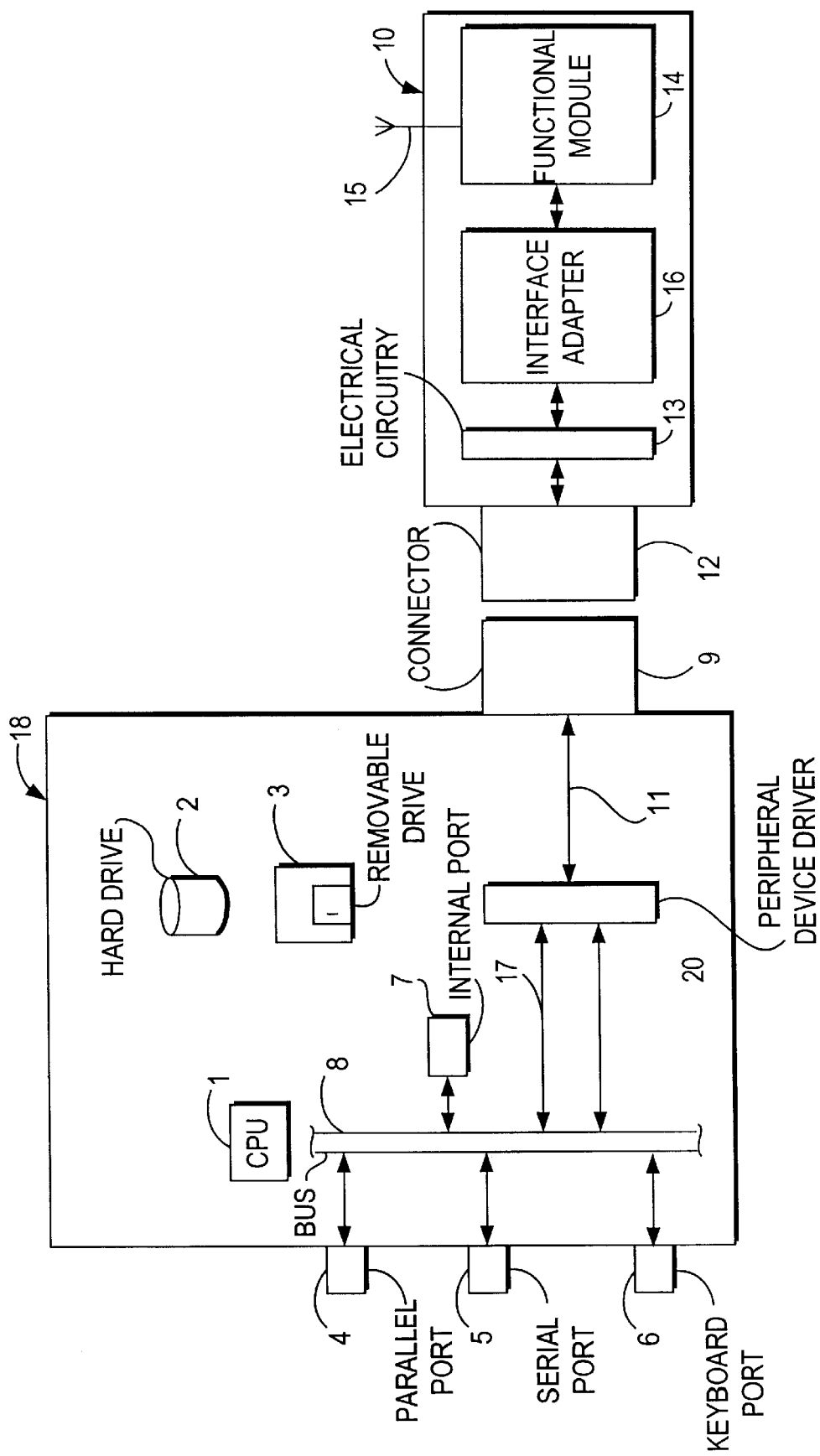
FIG. 1 is a schematic diagram showing one embodiment of an adaptive computer peripheral according to the present invention, coupled to a computer.

Referring first to FIG. 1, there is shown a conventional computer 18 and, coupled to it, an adaptive peripheral 10 according to the preferred embodiment of the present invention.

The conventional computer 18, which is shown highly schematically, includes a CPU 1, a hard disk drive 2, one or more removable disk drives 3, and a plurality of interface connectors or ports via which the computer may communicate with the outside world. These might include, for example, a parallel port 4, a serial port 5, a keyboard port 6, and so on. The computer may also include one or more internal interface connectors 7, for example SCSI, for the attachment of SCSI-compliant devices such as backup tape streamers. Communication between the various ports/connectors and the CPU may (but need not) be via a bus or series of buses 8.

In the embodiment of FIG. 1, the adaptive peripheral 10 is coupled to the computer's PCMCIA connector 9, although it will be understood that that is merely exemplary: the invention in its broadest form is not restricted to connection via any specific type of port.

The adaptive peripheral 10 attaches to the computer 18 by means of a compatible connector, in the embodiment of FIG. 1 a PCMCIA connector 12. The connector 12 is coupled by conventional electrical circuitry schematically shown at 13 to an interface adapter 16, to be described in more detail below. The electrical circuitry may take the form of one or more printed circuit boards. The items 12 and 13 may conveniently be referred to as the "electrical interface connector". The interface adapter itself is coupled to a functional module 14 which comprises the circuitry and components for performing the functions of the peripheral. In FIG. 1, the peripheral is a wireless communications interface, and the functional module therefore includes an antenna or aerial 15. The functional module 14 could alternatively comprise any number of possible peripheral components, for example additional memory chips, a LAN interface, an optical communications interface, a modem, a bar code reader, and so on. It will be evident to a skilled artisan how to select the functional module (which may be conventional per se), according to the desired functions of the peripheral.

The purpose of the interface adapter 16 is to enable the peripheral 10 to communicate with the computer 18 via a number of different communications protocols. In the FIG. 1 embodiment, one of those protocols will be the PCMCIA protocol, since that is the natural protocol used by the interface connectors 9,12, but the interface adapter 16 allows selective communication by other protocols as well. The interface adapter 16 may be formed of discrete components, or may alternatively, and preferably, be embodied as a suitable programmed microprocessor or ASIC chip. The circuitry 13 is preferably not active, but simply passes on to appropriate pins on the interface adapter chip signals received via the PCMCIA port 12.

The protocol to be used for communication between the computer and the peripheral is determined by the computer. by means of a peripheral device driver 20. This may either be embodied in hardware, as shown, or could alternatively comprise software running on the CPU 1. The device driver 20 transmits and receives signals along a line 11 which is coupled with the PCMCIA port 9. The driver places onto the line 11 both data signals, in the currently active communication mode, and also control signals which when received by the interface adapter 16 instruct the peripheral 10 to switch to another communications modality.

In its hardware form, as shown, the peripheral device driver 20 is adapted to receive signals along one or more lines 17, with each line carrying signals according to a different protocol. For example, one of the lines may carry PCMCIA signals, another parallel port signals, another serial port signals, and so on. Conveniently, these signals are identical to the signals sent to the dedicated PCMCIA, parallel and serial ports. Signals are intercepted by the device driver 20, and converted to appropriate signals along the line 11 according to the particular communications protocol which has currently been selected.

Alternatively, and preferably, the computer 18 dispenses with additional hardware by making us of a virtual (software) device driver 20, running on the CPU. This detects when attempts are made by the computer to communicate via any exterior port, and either arranges for the signals to be intercepted and placed instead on the line 11 or alternatively for the signals to be copied onto the line 11. In the exemplary embodiment of FIG. 1, for example, when the CPU attempts to communicate via the serial port 5, the device driver 20 intercepts the commands, and is capable of placing the serial signals onto the line 11 which, in this case, communicates with the peripheral via the PCMCIA port 9. The peripheral device driver 20 detects that the computer is attempting to communicate via the serial port, and sends out an appropriate control command via the PCMCIA port to instruct the interface adapter 16 to switch to its serial communications modality.

The device driver 20 needs to send not only data but also control signals via the selected port, and the interface adapter 16 accordingly needs to be able to distinguish between the two types of signal. In the preferred embodiment, the control signals may be supplied by forcing one or more of the pins on the port 9 into a configuration which would normally be impossible, or nonsensical. For example, in the embodiment of FIG. 1, the port 9 is a PCMCIA port, and control signals are sent by setting both OEJ and WEJ (pins 9 and 15) low. The interface adapter, on receipt of such a signal, realizes that such state is normally illegal under the PCMCIA protocol, and interprets it instead as a command to switch to another communications protocol.

If there are enough illegal/nonsensical states available to the system, by signalling through the port 9, separate control codes may be used to instruct the interface adapter 16 directly to switch to a given protocol. For example, a first illegal state at the port 9 could instruct the interface adapter 16 to switch to parallel signalling, a second state could instruct it to switch to serial signalling and so on. On receipt of the appropriate control signal, the interface adapter 16 then opens handshaking negotiations with the device driver 20 to confirm the open bi-directional communications channel in the normal way. Once the channel has been opened a program running on the CPU 1 may control the functional module 14 entirely transparently, without the user needing to be concerned about the exact communications protocol which is being used, nor about the fact that the program may expect to be controlling the peripheral on a different type of port from the one to which it is actually connected.

The situation is a little more complex when there are insufficient illegal/nonsensical signals which can be sent to the port 9 to control all the possible modes of operation of the peripheral. In such a case, the interface adapter may be programmed or hard-wired to cycle through all its possible modes of operation, one by one, until it finds one which is compatible with the signals the computer 18 is trying to send. This is illustrated in more detail in FIG. 3.

Figure 3:
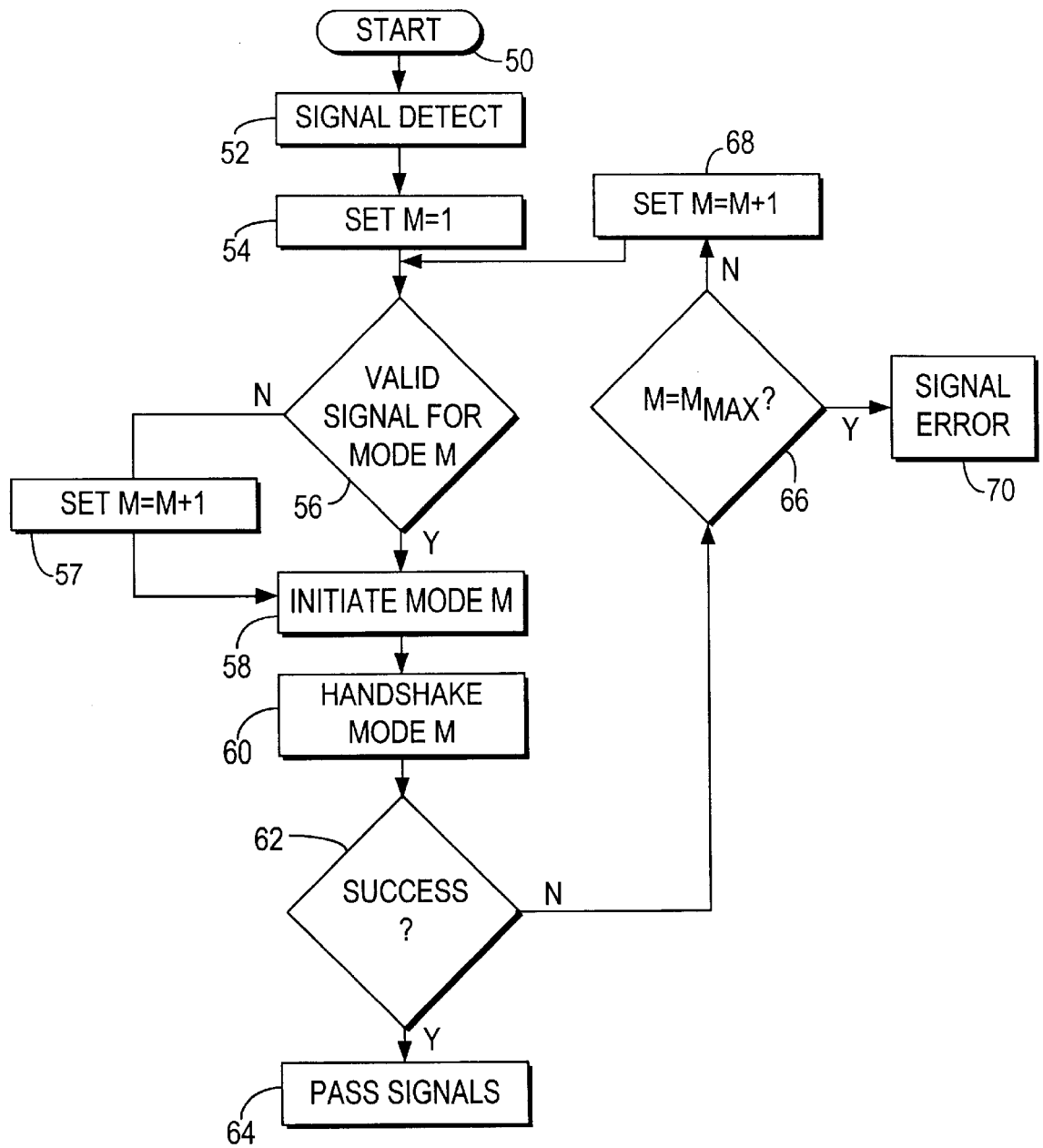
FIG. 3 illustrates the method used by the interface adapter to determine the interface modality.

FIG. 3 shows, in schematic form, an algorithm that may be used by the interface adapter 16, for example where the interface adapter comprises or includes a microprocessor. The algorithm makes use of a counter M which determines the particular communications modality that the peripheral is to use; for example, in one embodiment M=1 signifies the PCMCIA protocol, M=2 parallel signalling, M=3 serial signalling and so on. $M_{max}$ is the highest value of M which is understood by the interface adapter 16; for example, if the adapter is capable of communicating via PCMCIA, serial and parallel protocols then $M_{max}$ would be 3.

The algorithm starts at 50, and the interface adapter simply waits until a signal is detected, at box 52. It then sets M=1 at box 54, to prepare to decode that signal according to its first protocol. At box 56 a check is made as to whether the received signal is valid according to that first protocol. If it is, control passes to box 58 and then to box 60 for initiation and handshaking according to the current protocol. If the handshaking is successful, at box 62, control is then passed to box 64, and communication under the selected protocol may commence.

If the algorithm determines, at box 56, that the signal is not valid according to the current protocol, control is passed to box 57, where the mode is incremented by 1. An attempt is then made to initiate and handshake according to the next protocol, and once again success or otherwise is detected at box 62.

If initiation and/or handshaking fails, control is passed from box 62 to box 66, which determines whether all the possible modes have yet been tried. If so. control passes to box 70, and an error is signalled by the peripheral, back to the computer 18, to tell the computer that the peripheral cannot understand the signal that is being sent. If not all of the modes of operation have yet been tried. the next one is chosen at box 68, and control passes back to box 56 where the signal is checked to see whether it is a valid signal according to the next mode. This is repeated until all possible modes have been tried, and the mode selection algorithm finishes with either an error, box 70, or with a confirmation that signals may be passed, at box 64.

Figure 2:
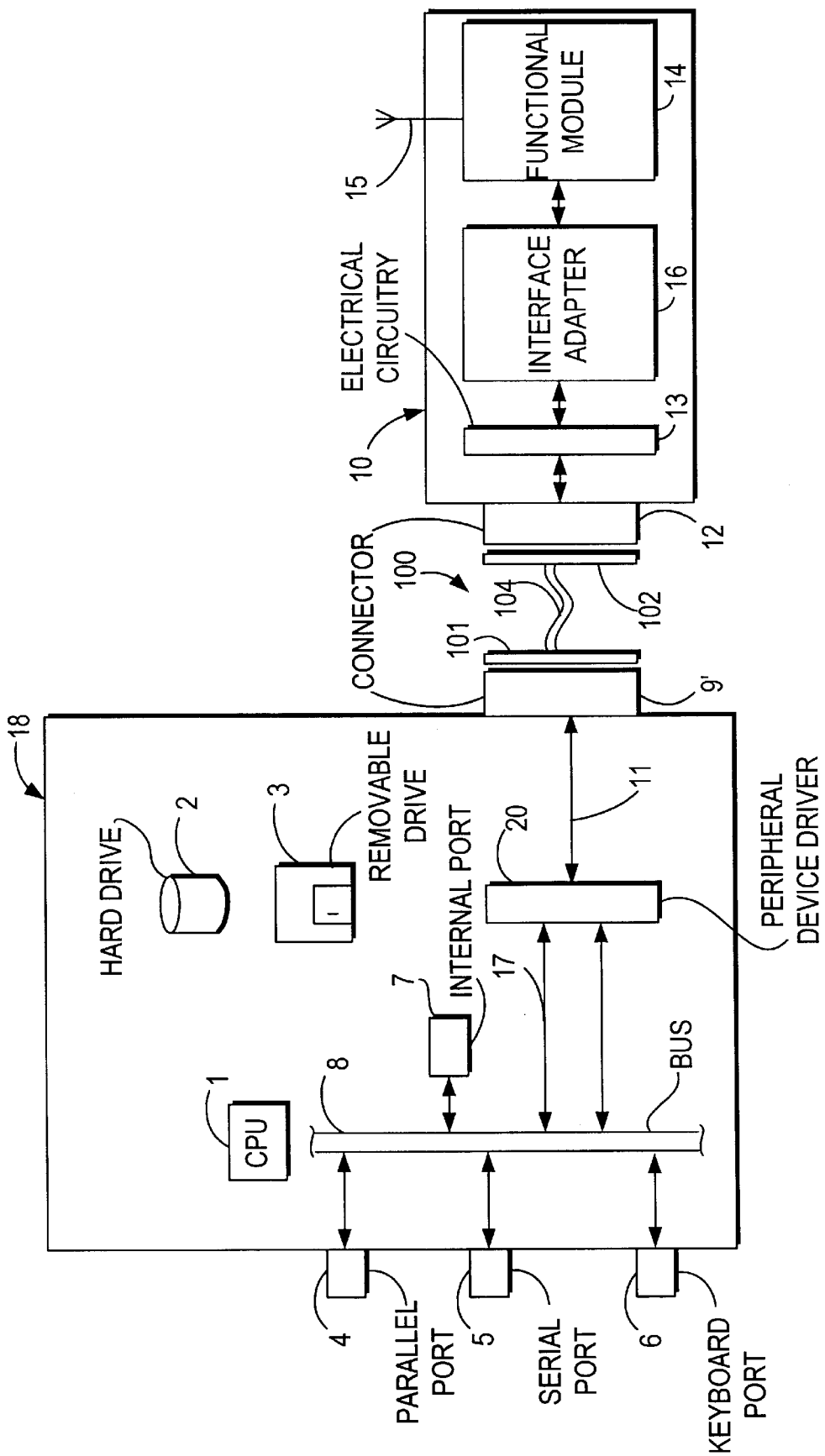
FIG. 2 shows an alternative embodiment making use of an adapter cable.

An alternative embodiment of the adaptive computer peripheral is shown in FIG. 2. Here, a connector 9' of the computer and the connector 12 of the peripheral are coupled via an adapter 100. The adapter comprises a first connector 101, which is compatible with the connector 9', and a second connector 102 which is compatible with the port 12. These are connected by a flexible electrical cable 104. Alternatively, wireless transmission could be used.

This embodiment may be used where, for example, the peripheral uses a PCMCIA interface 12, but where the computer 18 does not possess a PCMCIA-type connector. In FIG. 2, the port 9' represents a serial port, with the cable 104 providing appropriate signal assignments (for example as illustrated in FIGS. 4A, 4B and 4C) between the serial pins and the PCMCIA pins.

A specific example of the way in which the invention may be carried into practice will now be described, with reference to FIGS. 4A, 4B and 4C. This shows the exemplary signal correspondences that may be defined between a PCMCIA adapter, and a conventional plug-in PC card adapter.

During PCMCIA operation, the pins of the peripheral connector 12 carry signals that match the PCMCIA specification. This mode of operation provides a direct connection to a conventional PCMCIA slot controller. Accordingly, the connector may simply be inserted into a standard PCMCIA-type slot and used.

The peripheral 10 can, however, also accept non-PCMCIA-type signals. FIGS. 4A, 4B and 4C show the appropriate assignments. It will be appreciated by the skilled man that the data bus used in this embodiment is of 8 bits, but this can of course be extended to the full PCMCIA data bus specification as required.

If the OEJ and WEJ signals (pins 9 and 15) are tied low (normally an illegal or nonsensical state), the interface adapter 16 can receive and handle signals of a second interface protocol, allowing for example the interface connector 12 to operate as a serial bus interface. Handling of the alternative signal set engages if OEJ=WEJ=0 during the 4mS interval after RESET goes inactive.

By having the interface adapter 16 alter the handling of signals received, the peripheral 10 can be adaptively configured either as a true PCMCIA compliant interface, or as an I/O parallel interface, or as an I/O parallel interface plus a serial interface. In the preferred embodiment, the two options are mutually exclusive as certain PCMCIA pins are reused to provide the I/O and Serial interfaces.

The peripheral 10 also provides power management functions, with Power Down Request (PDREQ), Power Down Now (PDNOW), and Power Up Indicate (PUIND). During power management operations, care should be taken to tie all interface signals to appropriate levels to minimize power consumption. As a general rule, most signals should be tied low during a power down cycle. The peripheral 10 disables all true high signals (except true high resets) during power down and takes all control signals to a tri-state. The tri-state allows a system designer to tie all control outputs either high or low with a high impedance resistor. In the event the external logic has its power removed during a power down, a parasitic low will exist on the pin. It is usually important that input pins not be left floating.

Other embodiments are of course within the scope of the claims. The invention in its broadest from is applicable to any communications protocol, including but not restricted to serial, parallel, PCMCIA, SCSI, conventional PC-plug-in cards, and so on.

Various changes and modifications in the structure of the described embodiments are possible without departing from the spirit and scope of the invention, as set forth in the claims.

I claim:

1. A method of controlling communications between a computer and a peripheral having a default personal computer memory card international association (PCMCIA) standard protocol, comprising the steps of:
   a) disabling the PCMCIA protocol and instructing the peripheral to switch to a different communications protocol, by transmitting disabling control signals which are illegal under the PCMCIA protocol from the computer to the peripheral; and
   b) transmitting data signals from the computer to the peripheral to enable communication between the computer and the peripheral only according to the different protocol.

2. The method of claim 1; and further comprising the step of connecting the computer and the peripheral with signal-carrying lines, and wherein the disabling step is performed by transmitting at least one of the control signals with an illegal state as considered under the PCMCIA protocol on at least one of the lines.

3. The method of claim 2, wherein two of the lines are an output enable line and a write enable line which are set to a high state under the PCMCIA protocol, and wherein the disabling step is performed by, setting both-the output enable line and the write enable line to low states which are illegal under the PCMCIA protocol.

4. The method of claim 1, wherein the transmitting step is performed over a bi-directional communications channel.

5. The method of claim 1, wherein the instructing step is performed by controlling the peripheral to switch to a serial signaling protocol.

6. The method of claim 1, wherein the instructing step is performed by controlling the peripheral to switch to a parallel signaling protocol.

7. A system for controlling communications between a computer and a peripheral, comprising:
   a) a peripheral device driver controlled by the computer;
   b) an adapter in the peripheral and switchable from a default personal computer memory card- international association (PCMCIA) standard protocol to a different communications protocol;
   c) means in the device driver for disabling the PCMCIA protocol and for instructing the adapter to switch to the different protocol by transmitting disabling control signals which are illegal under the PCMCIA protocol to the adapter; and
   d) means in the device driver for transmitting data signals to the adapter to enable communication between the computer and the peripheral only according to the different protocol.

8. The system of claim 7; and further comprising a connector having signal-carrying lines for connecting the device drive and the adapter, and wherein the disabling means is operative for transmitting at least one of the control signals with an illegal state as considered under the PCMCIA protocol on at least one of the lines.

9. The system of claim 8, wherein two of the lines are an output enable line and a write enable line which are set to a high state under the PCMCIA protocol, and wherein the disabling means is operative for setting both the output enable line and the write enable line to low states which are illegal under the PCMCIA protocol.

10. A system for controlling communications between a computer and a peripheral, comprising:
   a) a peripheral device driver in the computer;
   b) an adapter in the peripheral and switchable from a personal computer memory card international association (PCMCIA) default communications protocol to a different communications protocol;
   c) a PCMCIA connector on the peripheral;
   d) a connector different from the PCMCIA connector on the computer;
   e) a cable connected between both connectors and having a plurality of signal-carrying lines including an output enable line and a write enable line;
   f) means in the device driver for disabling the PCMCIA default protocol by transmitting disabling control signals set to low states on the output enable line and the write enable line to the adapter, and for instructing the adapter to switch to the different protocol upon receipt of said disabling control signals; and
   g) means in the device driver for transmitting data signals to the adapter to enable communication between the computer and the peripheral only according to the different protocol.

* * * * *